Oct. 15, 1963 M. FRIEDLAND 3,106,796
AUTOMATIC FISHING SHORE BOAT
Filed June 25, 1962 2 Sheets-Sheet 1

INVENTOR.
MORRIS FRIEDLAND
BY
*Zoltan Holachek*
ATTORNEY.

Oct. 15, 1963
M. FRIEDLAND
3,106,796
AUTOMATIC FISHING SHORE BOAT
Filed June 25, 1962
2 Sheets-Sheet 2
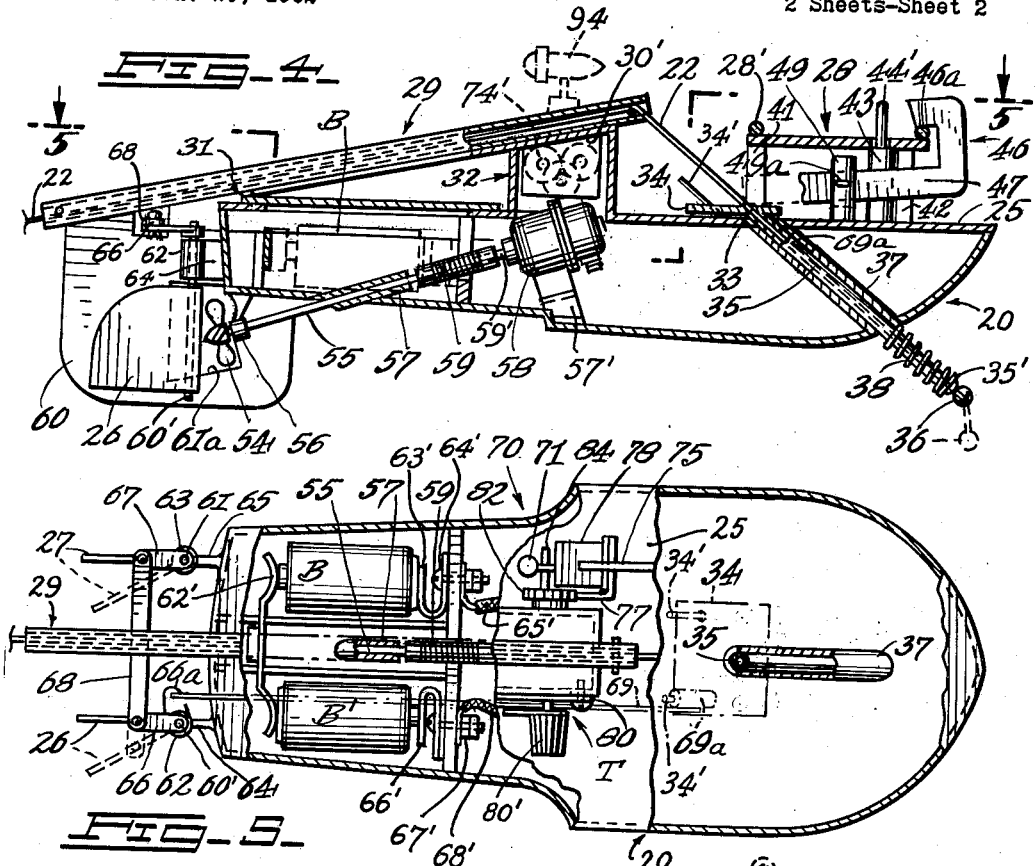
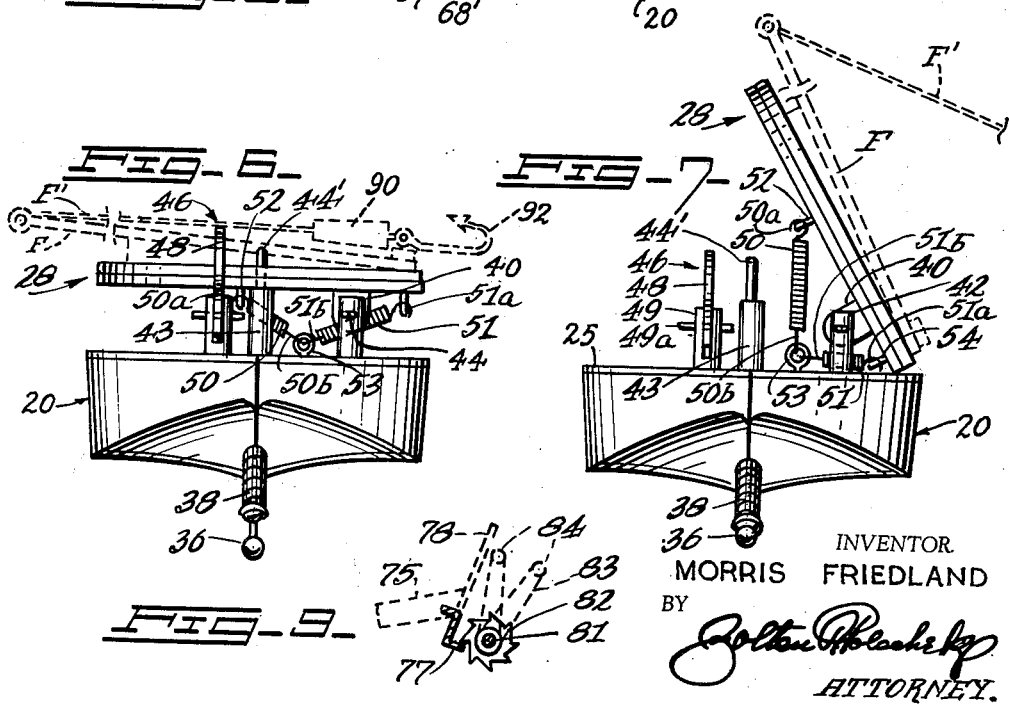
INVENTOR.
MORRIS FRIEDLAND
BY
*Zoltan Oleshko*
ATTORNEY.

United States Patent Office 3,106,796
Patented Oct. 15, 1963

3,106,796
AUTOMATIC FISHING SHORE BOAT
Morris Friedland, 9–19 F.D.R. Drive, New York 9, N.Y.
Filed June 25, 1962, Ser. No. 204,735
9 Claims. (Cl. 43—26.1)

This invention relates generally to offshore fishing and more particularly to apparatus for fishing offshore but controlled from the shore.

When fishing from the shore, fishermen usually use a fishing pole and line and cast the line with sinker and lure outwardly into the water. The distance the sinker and lure is cast is limited by the skill and power of the fisherman, and the placement of the lure in the desired area is difficult.

It is therefore a principal object of the present invention to make control offshore fishing possible from the shore.

Another object of the present invention is to provide apparatus for carrying fishing tackle away from the shore a desired distance and automatically casting the sinker and lure to the desired area under control from the shore.

Another object of the invention is to provide automotive apparatus for carrying fishing tackle away from the shore a desired distance, automatically casting the tackle into the water, carrying on the fishing operation a predetermined length of time and automatically returning the apparatus with the fishing tackle and fish, if any, to the shore, all under control from the shore.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 4 is a longitudinal sectional view taken on the line 4—4 of FIG. 3.

FIG. 6 is a front view of the apparatus of FIG. 2, the fishing tackle being shown in dash lines in inoperative position.

FIG. 7 is a similar view but showing the fishing tackle cast away from the apparatus.

FIG. 8 is a sectional view taken on the line 8—8 of FIG. 3, showing the motor control switch in ON position and in moved OFF position.

FIG. 9 is a sectional vew taken on the line 9—9 of FIG. 3.

Figure 1:
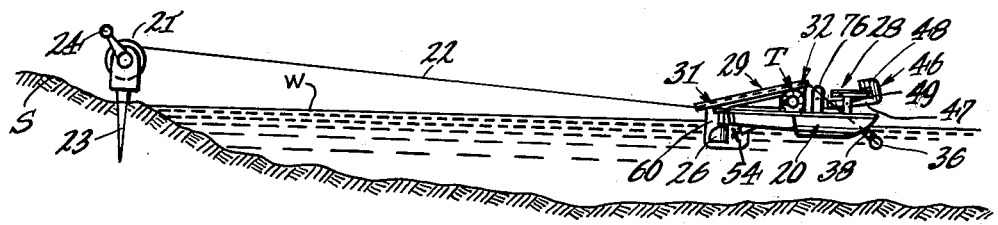
FIG. 1 is a perspective view of a body of water with fishing apparatus embodying the invention shown in operative position away from shore and under control from the shore.

Referring in detail to the drawings and with particular reference to FIG. 1, apparatus embodying my invention is shown partly on a body of water W and partly on a shoreline S. The water-borne apparatus comprises a miniature boat 20 and the onshore apparatus includes a fishing reel 21 supported on a post 23 driven into the shore. A line 22 extends from the reel to the boat 20. The line is manipulated by a handle 24 on the reel.

Figure 2:
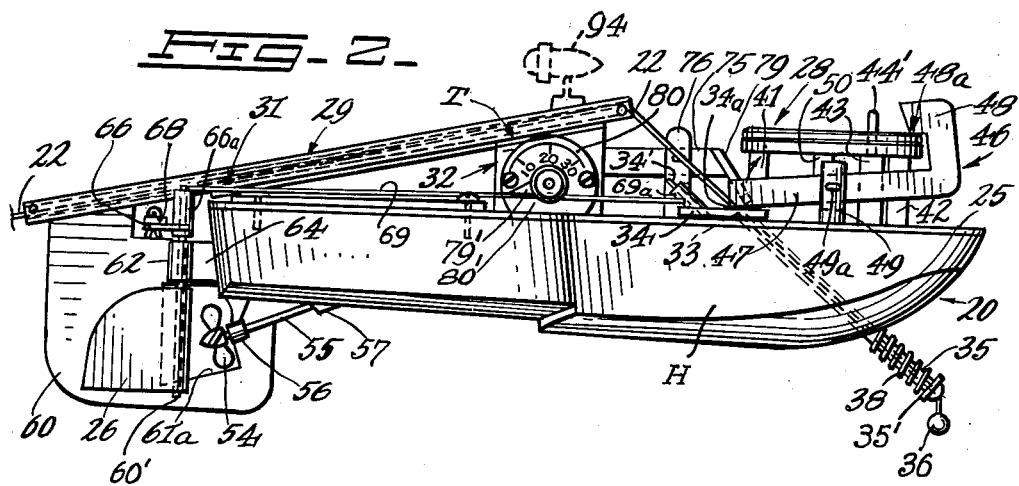
FIG. 2 is an enlarged side elevational view of the offshore apparatus forming part of the invention, the onshore apparatus being omitted.
Figure 3:
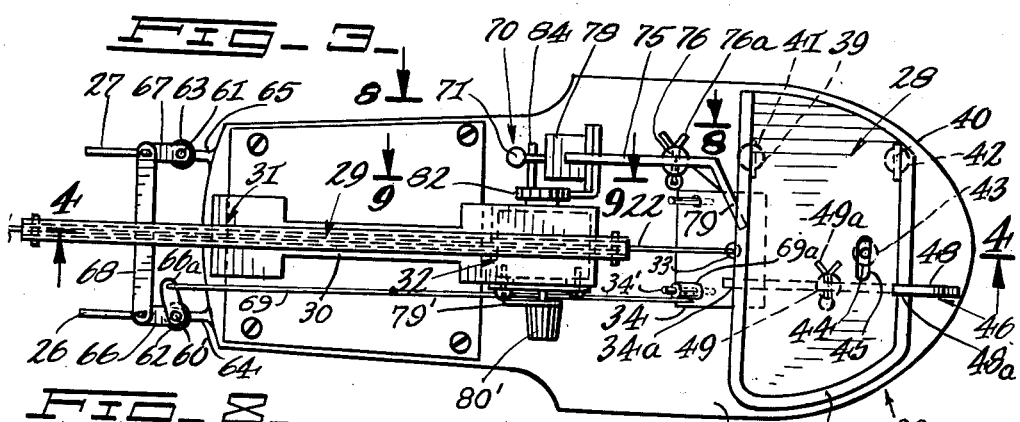
FIG. 3 is a top plan view of the apparatus shown in FIG. 2, parts being omitted.

With particular reference to FIG. 2, the boat 20 consists of a hull H having a flat deck 25. Twin rudders 26 and 27 are tiltably mounted rearwardly of the hull.

At the front of the boat, over the deck 25, a transparent rectangular-shaped plastic flat platform 28 is tiltably mounted at one end thereof. A rail 28′ surrounds the long sides and one end edge of the platform, the other tilted end being clear of edge obstructions.

An elongated transparent plastic tubular member 29 is supported over the rear half of the deck at the center thereof in an inclined condition with its rear end extending downwardly below the top of the deck and its front end projecting upwardly above the deck. The tubular member is open at both ends and rests on an elongated flat plastic plate 30 having its rear end secured by adhesive to the top edge of the stern of the boat and its forward end secured flatwise by adhesive to the inclined roof 30′ of a box-like housing 32 on the deck. The rear end of the tubular member 29 extends along and is secured by adhesive to the top edge of a plastic plate 60 that is disposed vertically and forms a rearward extension of the stern of the boat and is secured to the hull by adhesive.

A plastic tubular plunger 35 extends through a hole in the deck 25 forward of the inner end of tubular member 29 and through a tubular bearing 37 in the hollow interior of the hull and out through a hole in the bottom of the hull forward of the hole in the deck to the exterior of the hull at an inclination to the vertical. The inner end of the plunger 35 supports a rectangular-shaped plate 34 disposed flatwise of the deck and provided with a hole 33 therein communicating with the end of the plunger 35. The end of the plunger 35 is fastened to the plate around the hole 33 by adhesive. The plunger 35 and plate 34 move as a unit. The plate 34 is guided in its movements by a pair of pins 34′ extending from the deck at an angle parallel to the angle of bearing 37 and passing through holes in the plate at the ends thereof. The line 22 extends from the reel 21 through the tubular member 29 through the hole 33 in the plate 34 and downwardly through the plunger 35 and outwardly thereof. A plastic ball 36 is fastened to the outer end of the line 22, the ball being larger in diameter than the diameter of the plunger 35. The ball normally hangs loosely outwardly of the end of the plunger 35. A compression spring 38 is sleeved around the plunger 35 outwardly of the hull with one end seated against the hull and its other end impinging against a washer 35′ fastened to the end of the plunger 35. The spring tends to urge the plunger 35 outwardly so as to normally seat the plate 34 against the deck 25 of the boat.

The mounting for the tiltable platform 28 on the top of the deck 25 at the front comprises a pair of upright bifurcated studs 41 and 42 along one side of the deck. A pair of flat perforated ears 39 and 40 depend from one end of the platform and are disposed between the bifurcations of the studs and are held in loosely nested relation by cotter pins 44 extending through the perforations and aligned holes in the slotted studs. A flat J-shaped bar 46 is pivotally mounted midway its ends between the bifurcations of a slotted upright stud 49 on the deck adjacent the center of the deck. The bar is disposed in a vertical plane with its hooked end extending upwardly in the path of movement of the platform 28. The other end of the bar is disposed over and in the path of movement of the plate 34. A cylindrical post 43 is mounted on the deck adjacent the stud 49 and is provided with an upstanding pin 44′ which is adapted to extend through a hole 45 in the platform 28 when the platform is swung to flatwise inoperative position as shown in FIG. 2, the platform engaging the top of the post which serves as a stop and support for the platform. A coil spring 50 has one looped end 50<sup>b</sup> fastened to an eyelet 53 on the deck between the stud 49 and studs 41 and 42 and its other looped end 50<sup>a</sup> fastened to an eyelet 52 secured to the platform 28 at its center. When the platform is in flatwise condition, spring 50 is disposed at a slight inclination to the vertical as seen in FIG. 6. Another coil spring 51 has one looped end 51b secured to eyelet 53 on the deck and its other looped end 51a fastened to an eyelet 54 on the platform adjacent its tiltably mounted end. The spring 51 is normally disposed at an angle to the horizontal as viewed in FIG. 6. The springs 50 and 51 tend to urge the platform 28 to an inoperative horizontal position and to an open operative position, respectively, as shown in FIGS. 6 and 7.

The drive mechanism for the boat 20 comprises a propeller 54 mounted on the outer end of a driven shaft 55 which extends through a tubular bearing 57 extending through an opening in the bottom of the hull and through a bracket bearing 56 depending from the bottom of the hull at the stern of the boat. The propeller is disposed in an opening 61a in the vertically disposed guard plate 60. The rudders 26 and 27 are mounted at the sides of the propeller on shafts 60' and 61 disposed in vertically disposed bearings 62 and 63 secured to the bow by flanges 64 and 65. The upper ends of the rudder shafts 60' and 61 are held to a pair of horizontal arms 66 and 67 which by means of the connecting arms 68 are linked to each other, with the arm 66 having an extension 66a.

An elongated rod 69 connects the extension 66a to a tubular bearing member 69a carried by the plate 34 at one end thereof and sleeved around one of the guide pins 34'.

Figure 5:
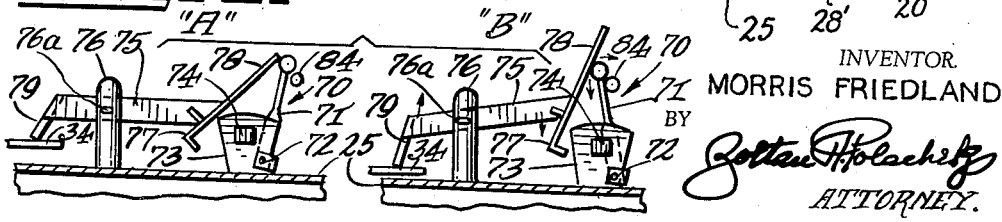
FIG. 5 is a longitudinal sectional view taken on the line 5—5 of FIG. 4.

The inner end of shaft 55 is flexibly connected by a spring coupling 59 to the end of the drive shaft 59' of an electric motor 58 supported on a cradle 57' mounted on the bottom of the hull. The motor is activated by a pair of electric dry cell batteries B and B'. The center terminal of the battery B is connected to the side terminal of the battery B' by a bus bar 62', and the side terminal of the battery B' is connected to the motor 58 by a spring contact 63', screw 64' and conductor 65'. The center contact of the other battery B' is connected to the motor 58 by a spring contact 66', screw 67', and conductor 68', as seen in FIG. 5.

A motor control switch 70 includes an upstanding insulating plate 73 mounted edgewise on the deck and secured thereon by adhesive. A metallic contact 74 is fastened to one side of the plate and is connected in series with the motor 58 by the conductor 65'. Another angular metal contact plate 72 is secured to the other side of the insulating plate 73, which contact plate 72 is connected in series with the motor 58 by means of the conductor 68'. A movable contact member in the form of an elongated handle 71 is pivotally and insulatedly connected to contact plate 72 into contact with contact plate 74 to close the circuit through the motor.

Means is provided for manually controlling the switch 70 from the shore. For this purpose, a flat plastic lever bar 75 is pivotally mounted midway its ends on a bifurcated stud 76 mounted on the deck adjacent the insulating plate 73. The bar is disposed vertically edgewise and carries a plate 78 disposed perpendicularly to the plane of the bar. Plate 78 is normally disposed above and in engagement with the movable member 71 of the switch. The other end of the bar is formed with an extension 79 which is disposed angularly to the plane of the bar and is normally disposed over and in the path of upward movement of the plate 34. Upward movement of the plate 34 tilts the bar 75 so that its plate 78 presses the movable switch member or handle 71 away from contact 74 opening the circuit through the motor 58.

The invention contemplates carrying on the fishing operation for a predetermined period of time. Accordingly, an automatic electric timer indicated generally at T is operatively connected to the motor 58. The timer T is conventional and is only shown diagrammatically. The timer mechanism includes a train of gearing 74' mounted in the housing 32 above the deck. A dial 80 is mounted on a side wall of the housing, the dial being shown as representing time intervals of "10," "20" and "30" minutes. A knob 80' and pointer 79' are operatively connected to the timer mechanism in the housing and associated with the dial for the purpose of presetting the time for fishing. In order to prevent premature operation of the time, the timing mechanism is locked by means of a hooked end 77 extending from the lever bar 75 (see FIG. 8). As will be seen in FIG. 9, the timer shaft 81 is provided with a ratchet wheel 82. The teeth of the wheel 82 mesh with the hooked end 77 on the lever bar 75. The timer shaft 81 has a swinging arm 83 with a pin extension 84, the latter contacting the rear of the switch member or handle 71 (see FIG. 8).

In operation, a fishing pole F and fishing line F' are used with the apparatus. The fishing pole is secured at one end to the top surface of the platform 28 as shown in dash lines in FIGS. 6 and 7. A sinker 90 and hook 92 are connected in the usual way to the end of the line. The hook is suitably baited. The pole, line, sinker and hook constitute the fishing tackle.

On shore, the timer T is manually set by the knob 80' for the time interval desired for fishing. The timer mechanism is locked by means of the hooked end 77 meshing with the teeth of the ratchet wheel 82 to the inoperative position shown in FIG. 8 at B. The rudders 26 and 27 are disposed parallel to the sides of the hull. The motor 58 is energized by manually moving the movable switch member or handle 71 into contact with contact plate 74 of switch 70. The motor drives the propeller 54 which in turn drives the boat 20 forward away from shore S. The line 22 is paid out automatically from reel 21 as the boat moves outwardly. When the boat has traveled the desired distance away from shore, the line 22 is pulled inwardly toward the shore by the handle 24 of the reel 21 whereupon the ball 36 is pulled against the washer 35' of the tubular member 35 forcing said member 35 inwardly against the action of spring 38 thereby moving the plate 34 against the extension 47 of lever 46 whereby said lever 46 is tilted moving the extension 47 upwardly and releasing the hooked end 48 thereof from the platform 28. The movement of the extension 47 upwardly forces the platform 28 upwardly around its pivots 39 and 40. This upward movement of platform 28 is enhanced by the springs 50 and 51. The extension 47 and the energy stored in the springs 50 and 51 when released swing the platform 28 with a sudden jerk or snap action thereby throwing or casting the fishing line F' with its sinker 90 and hook or lure 92 into the water W a distance from the boat.

The fishing line F' is thinner than the line 22 and may be attached to the ball 36 in any suitable manner, so that in case the hook 92 becomes entangled with an obstacle, or the fish breaks the line F', the line 22 will not be damaged.

During movement of the extension 47, the plate 34 engages the extension 79 on lever bar 75 tilting said lever bar carrying the extension 79 upwardly and moving the plate 78 carried by the bar downwardly over the movable switch member or handle 71 forcing said movable switch member out of contact with the contact plate 74, thereby opening the circuit through the motor 58 and thereby stopping propulsion of the boat. The boat will remain stationary and the fishing operation will be carried on for the period of time set by the timing mechanism. Simultaneously with the movement of the plate 34 to stop the motor 58, the rod 69 is moved longitudinally by the tubular member 35 so as to tilt the rudders 26 and 27 at an angle to the axis of the boat as shown in dash lines in FIG. 5 so as to condition the boat for turning.

During the movement of the boat 20 away from shore, the timer T is locked in inoperative position by the hooked end 77 of bar 78. When the tubular member 35 is manually pulled to stop the motor, the upward movement of the plate 34 carried thereby engages the extension 79 of the lever bar 75 and disengages the hooked end 77 from the teeth of the ratchet wheel 82 so that the timing mechanism is unlocked and started. The timing mechanism operates until the expiration of the time set for fishing, whereupon the movable switch member or handle 71 of switch 70 is automatically moved by the pin 84 of the arm 83 of the timing mechanism into contact with the contact plate 74 thereby closing the circuit through the motor 58 to propel the boat and due to the angular condition of the rudders 26 and 27 the boat will be turned around and when completely turned and headed for shore, the pressure is taken off of the tubular member 35 permitting the spring 38 to force the tubular member 35 outwardly carrying the plate 34 downwardly toward the deck and straightening out the rudders 26 and 27 whereupon the boat is propelled to shore, carrying the fishing tackle and any fish back to shore. During the return movement of the boat to shore, the operator takes up the slack in line 22 by turning the handle 24 of the reel 21.

An electric lamp 94 may be mounted on the roof 30' of housing 32 and electrically connected to the batteries B and B' for signalling purposes.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. Apparatus of the kind described comprising in combination a self-contained miniature boat, a spring-pressed swingable horizontal platform on the deck at one end thereof, a lever movably mounted on the deck, said lever movable against the platform, fishing tackle including a fishing line secured to and supported on the platform, an electric motor in the boat for propelling the same, an electric switch in the boat remotely controlled for starting and stopping the motor, rudders connected to the boat rearwardly thereof for steering the boat, means for moving said lever against the platform whereby the platform casts the fishing line overboard, and timing mechanism in the boat operatively connected to said switch for predetermining the time spent in fishing, said means for moving said lever including a plunger slidably mounted in the boat, a plate secured to one end of said plunger and movable against the lever to move the same and a flexible line attached to said plunger for sliding the same.

2. Apparatus of the kind described comprising in combination a self-contained miniature boat, a spring-pressed swingable horizontal platform on the deck at one end thereof, a lever movably mounted on the deck, said lever movable against the platform, fishing tackle including a fishing line secured to and supported on the platform, an electric motor in the boat for propelling the same, an electric switch in the boat remotely controlled for starting and stopping the motor, rudders connected to the boat rearwardly thereof for steering the boat, means for moving said lever against the platform whereby the platform casts the fishing line overboard, and timing mechanism in the boat operatively connected to said switch for predetermining the time spent in fishing, said timing mechanism including a shaft, a ratchet wheel on the shaft, said lever having a portion meshing with the teeth of said wheel for holding the lever against movement and means for releasing said portion from the wheel.

3. Apparatus of the kind described comprising in combination a self-contained miniature boat, a spring-pressed swingable horizontal platform on the deck at one end thereof, a lever movably mounted on the deck, said lever movable against the platform, fishing tackle including a fishing line secured to and supported on the platform, an electric motor in the boat for propelling the same, an electric switch in the boat remotely controlled for starting and stopping the motor, rudders connected to the boat rearwardly thereof for steering the boat, means for moving said lever against the platform whereby the platform casts the fishing line overboard, and timing mechanism in the boat operatively connected to said switch for predetermining the time spent in fishing, said means for moving said lever including a plunger slidably mounted in the boat, a plate secured to one end of said plunger and movable against the lever to move the same and a flexible line attached to said plunger for sliding the same, said timing mechanism including a shaft, a ratchet wheel on the shaft, said lever having a portion meshing with the teeth of said wheel for holding the lever against movement until released by said plate.

4. In a miniature fishing boat controlled from the shore, a hollow hull, a deck, an electric motor in the hull, a propeller protruding from the bow of the hull, means of operative connection between the motor and propeller for propelling the boat, a switch controlling said motor, means actuated from the shore for controlling said switch, rudders secured to and disposed rearwardly of the hull for steering the boat, a horizontally disposed spring pressed platform swingably mounted at one end on the deck, the mounting of the platform including a pair of bifurcated studs mounted on the deck, perforated ears depending from one end of the platform disposed between the bifurcations of the studs, pins inserted through aligned openings in the bifurcations and the perforations in said ears, fishing tackle supported on the platform, said tackle including a fishing pole having one end secured to the platform, a fishing line secured to the opposite end of said pole, means for normally holding said platform against movement, and means for releasing said holding means and moving said platform with a snap action to cast the fishing line overboard.

5. The miniature fishing boat as defined in claim 4, wherein the switch includes a movable switch member extending above the deck and wherein the means actuated from the shore for controlling said switch includes a plunger slidably supported in the hull and extending through the top and bottom of the hull, a plate carried by the plunger at the top thereof and a flexible line anchored at one end on the shore and anchored at its other end to the bottom end of the plunger, a lever pivotally mounted on the deck adjacent said movable switch member, said lever carrying a plate, said movable switch member disposed in the path of movement of said lever plate, said plunger plate adapted to move the lever plate against the movable switch member upon manual pulling on the flexible line on the shore.

6. The miniature fishing boat as defined in claim 4, wherein the means for holding the platform includes a lever pivotally mounted on the deck with a hooked end normally engaging the platform.

7. The miniature fishing boat as defined in claim 4, wherein the means for holding the platform includes a lever pivotally mounted on the deck with a hooked end normally engaging the platform, and wherein the means for releasing said holding means and moving said platform includes compression springs having one end secured to the platform at spaced points thereon and having the other end secured to the deck, a plunger slidably supported in the hull and extending through the top and bottom of the hull, a plate carried by the plunger at the top thereof and a flexible line anchored at one end on the shore and anchored at its other end to the bottom end of the plunger, said plunger plate disposed under said hooked lever and adapted to be moved against said hooked lever for pivoting the same to release the platform for swinging movement upon manual pulling on the flexible line on the shore.

8. The miniature fishing boat as defined in claim 7, wherein the plate carried by the plunger has a pair of spaced holes and wherein a pair of guide pins extend upwardly from the deck at an angle parallel to the angle of the plunger and pass through a pair of spaced holes in the plunger plate for guiding the movements of the plunger plate.

9. The miniature fishing boat as defined in claim 3 characterized by means for adjusting the position of the rudders including an elongated rod having one end connected to the rudders and having its other end connected to a tubular bearing member carried by the plate on the end of the plunger.

References Cited in the file of this patent

UNITED STATES PATENTS 2,709,316   McCabe ---------------- May 31, 1955